US012584451B2

(12) United States Patent
Matsunami et al.

(10) Patent No.: US 12,584,451 B2
(45) Date of Patent: Mar. 24, 2026

(54) METHOD OF AND SYSTEM FOR CONTROLLING MARINE PROPULSION DEVICE

(71) Applicant: YAMAHA HATSUDOKI KABUSHIKI KAISHA, Iwata (JP)

(72) Inventors: Takuro Matsunami, Shizuoka (JP); Tomokatsu Terada, Shizuoka (JP); Keigo Kawasumi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 18/958,645

(22) Filed: Nov. 25, 2024

(65) Prior Publication Data

US 2025/0172103 A1 May 29, 2025

(30) Foreign Application Priority Data

Nov. 29, 2023 (JP) ................................ 2023-201873

(51) Int. Cl.
*F02D 41/14* (2006.01)

(52) U.S. Cl.
CPC .. *F02D 41/1497* (2013.01); *F02D 2200/1015* (2013.01)

(58) Field of Classification Search
CPC ......... F02D 41/1497; F02D 2200/1015; F02D 41/1498
See application file for complete search history.

(56) References Cited

U.S. PATENT DOCUMENTS

| | | | | | |
|---|---|---|---|---|---|
| 5,287,737 | A * | 2/1994 | Osawa | G01M 15/11 73/114.07 |
| 5,687,692 | A * | 11/1997 | Togai | F02D 41/1498 123/436 |
| 6,604,410 | B2 * | 8/2003 | Varady | F02P 5/1455 73/114.08 |
| 2001/0049579 | A1 * | 12/2001 | Fujino | G01M 15/04 701/115 |
| 2013/0312503 | A1 | 11/2013 | Terada | |
| 2014/0261317 | A1 * | 9/2014 | Loucks | F02D 19/0623 123/350 |
| 2015/0143883 | A1 * | 5/2015 | Yu | G01M 15/11 73/114.05 |
| 2019/0101472 | A1 * | 4/2019 | Wakimura | F02D 45/00 |

FOREIGN PATENT DOCUMENTS

| | | | | |
|---|---|---|---|---|
| EP | 1447655 A2 * | 8/2004 | G01M 15/11 |
| EP | 2666999 A2 * | 11/2013 | G01M 15/046 |
| JP | H0552707 A * | 3/1993 | G01M 15/11 |
| JP | H09166041 A * | 6/1997 | |
| JP | 3495463 B2 * | 2/2004 | |
| JP | 2013245560 A | 12/2013 | |
| TW | 201700858 A * | 1/2017 | F02B 77/08 |
| WO | WO-2016194953 A1 * | 12/2016 | F02B 77/08 |

* cited by examiner

*Primary Examiner* — Hung Q Nguyen
(74) *Attorney, Agent, or Firm* — Keating & Bennett, LLP

(57) ABSTRACT

A method of controlling a marine propulsion device including an engine including a plurality of cylinders and a crankshaft includes obtaining an angular acceleration of the crankshaft, obtaining a determination parameter to determine whether or not a misfire has occurred in the engine based on the angular acceleration of the crankshaft, and determining whether or not the misfire has occurred in the engine by comparing the determination parameter and a plurality of thresholds for each of the plurality of cylinders.

8 Claims, 7 Drawing Sheets

METHOD OF AND SYSTEM FOR CONTROLLING MARINE PROPULSION DEVICE

CROSS REFERENCE TO RELATED APPLICATIONS

This application claims the benefit of priority to Japanese Patent Application No. 2023-201873 filed on Nov. 29, 2023. The entire contents of this application are hereby incorporated herein by reference.

BACKGROUND OF THE INVENTION

1. Field of the Invention

The present invention relates to methods of and systems for controlling marine propulsion devices.

2. Description of the Related Art

There is a type of marine propulsion device that determines whether or not a misfire has occurred in an engine. For example, in an outboard motor described in Japan Laid-open Patent Application Publication No. 2013-245560, a controller obtains an angular acceleration of a crankshaft and a deviation of the angular acceleration. The controller determines whether or not the angular acceleration is less than a predetermined threshold of the angular acceleration. The controller determines whether or not the absolute value of the deviation of the angular acceleration is greater than a predetermined threshold of the deviation. The controller determines that a misfire has occurred in the engine when the angular acceleration is less than the angular acceleration threshold and simultaneously the absolute value of the deviation of the angular acceleration is greater than the deviation threshold.

In the outboard motor described above, it is determined whether or not a misfire has occurred in each of a plurality of cylinders in the engine based on an angular acceleration threshold and a deviation threshold, both of which are applied in common among the plurality of cylinders. However, a combustion state varies among the cylinders. Thus, an appropriate threshold for accurately determining whether or not a misfire has occurred depends on the cylinders. Because of this, enhancing the accuracy of determining whether or not a misfire has occurred is not easy when, as described above, it is determined whether or not a misfire has occurred in each of the plurality of cylinders based on the angular acceleration threshold and the deviation threshold, both of which are applied in common among the plurality of cylinders.

SUMMARY OF THE INVENTION

Example embodiments of the present invention enhance the accuracy of determining misfires in engines of marine propulsion devices including engines.

According to an example embodiment of the present invention, a method of controlling a marine propulsion device including an engine including a plurality of cylinders and a crankshaft includes obtaining an angular acceleration of the crankshaft, obtaining a determination parameter to determine whether or not a misfire has occurred in the engine based on the angular acceleration of the crankshaft, and determining whether or not the misfire has occurred in the engine by comparing the determination parameter and a plurality of thresholds set for each of the plurality of cylinders.

According to another example embodiment of the present invention, a system for controlling a marine propulsion device including an engine including a plurality of cylinders and a crankshaft includes a sensor to detect angular acceleration of the crankshaft, and a controller configured or programmed to obtain the angular acceleration of the crankshaft, obtain a determination parameter to determine whether or not a misfire has occurred in the engine based on the angular acceleration of the crankshaft, and determine whether or not the misfire has occurred in the engine by comparing the determination parameter and a plurality of thresholds set for each of the plurality of cylinders.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
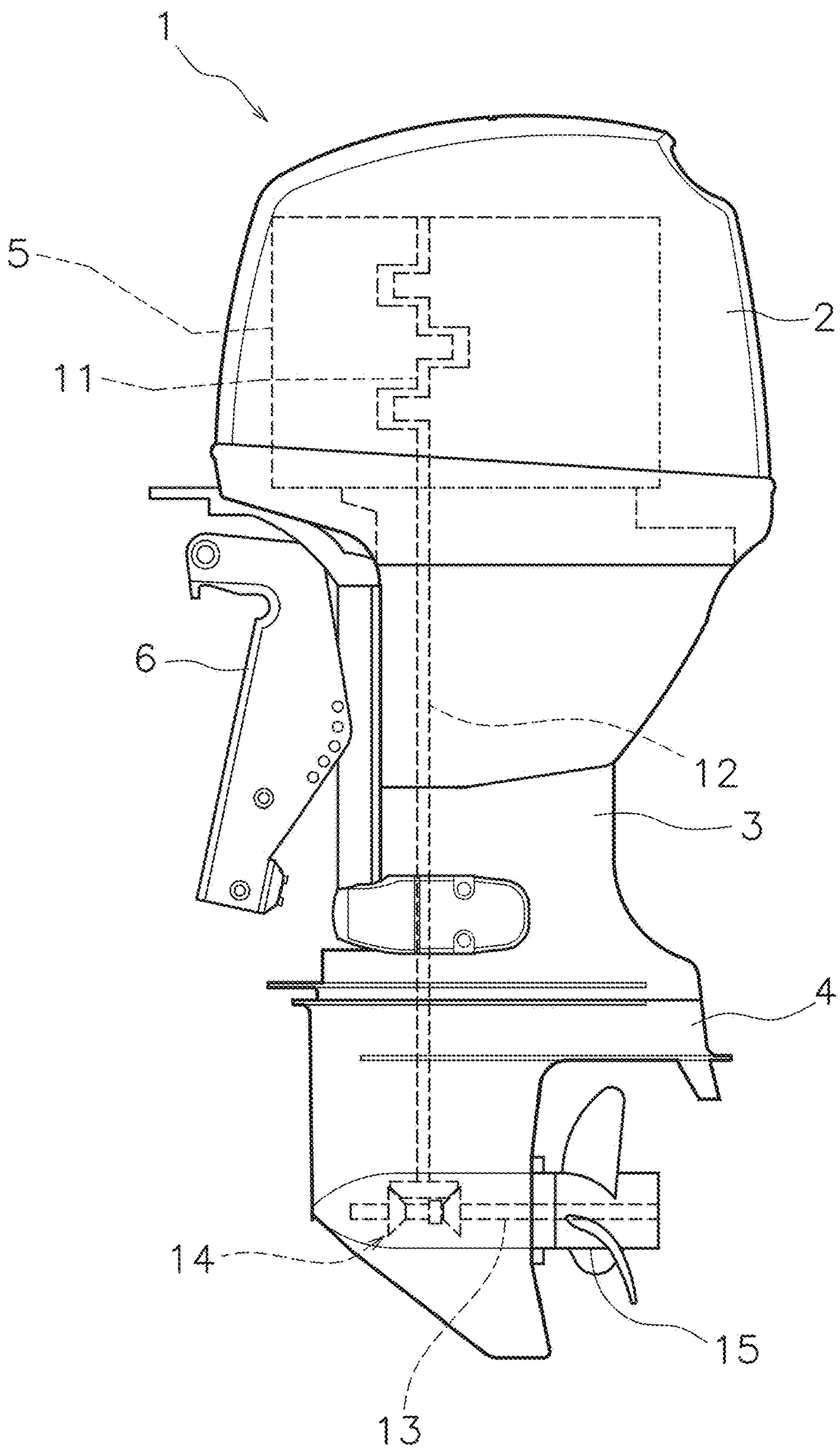
FIG. 1 is a side view of a marine propulsion device according to an example embodiment of the present invention.

Marine propulsion devices according to example embodiments of the present invention will be hereinafter explained with reference to drawings. FIG. 1 is a side view of a marine propulsion device 1 which, according to the present example embodiment, is an outboard motor. The marine propulsion device 1 includes a cowl 2, an upper housing 3, a lower housing 4, an engine 5, and a bracket 6. The upper housing 3 is disposed below the cowl 2. The lower housing 4 is disposed below the upper housing 3. The marine propulsion device 1 is attached to a watercraft (not shown in the drawings) through the bracket 6. The engine 5 is disposed inside the cowl 2. The engine 5 includes a crankshaft 11. The crankshaft 11 extends in an up-and-down direction.

The marine propulsion device 1 includes a drive shaft 12, a propeller shaft 13, and a shift mechanism 14. The drive shaft 12 is disposed inside the upper housing 3 and the lower housing 4. The drive shaft 12 extends in the up-and-down direction. The upper end of the drive shaft 12 is coupled to the lower end of the crankshaft 11.

A propeller 15 is disposed at a lower portion of the lower housing 4. The propeller 15 is disposed below the engine 5. The propeller 15 is coupled to the propeller shaft 13. The propeller shaft 13 extends in a back-and-forth direction. The propeller shaft 13 is coupled to the drive shaft 12 through the shift mechanism 14. The shift mechanism 14 switches the rotational direction of a mechanical power to be transmitted from the drive shaft 12 to the propeller shaft 13. The shift mechanism 14 includes, for instance, a plurality of gears and a clutch. The propeller shaft 13 is driven and rotated by a drive force to be transmitted thereto from the engine 5 via the drive shaft 12.

Figure 2:
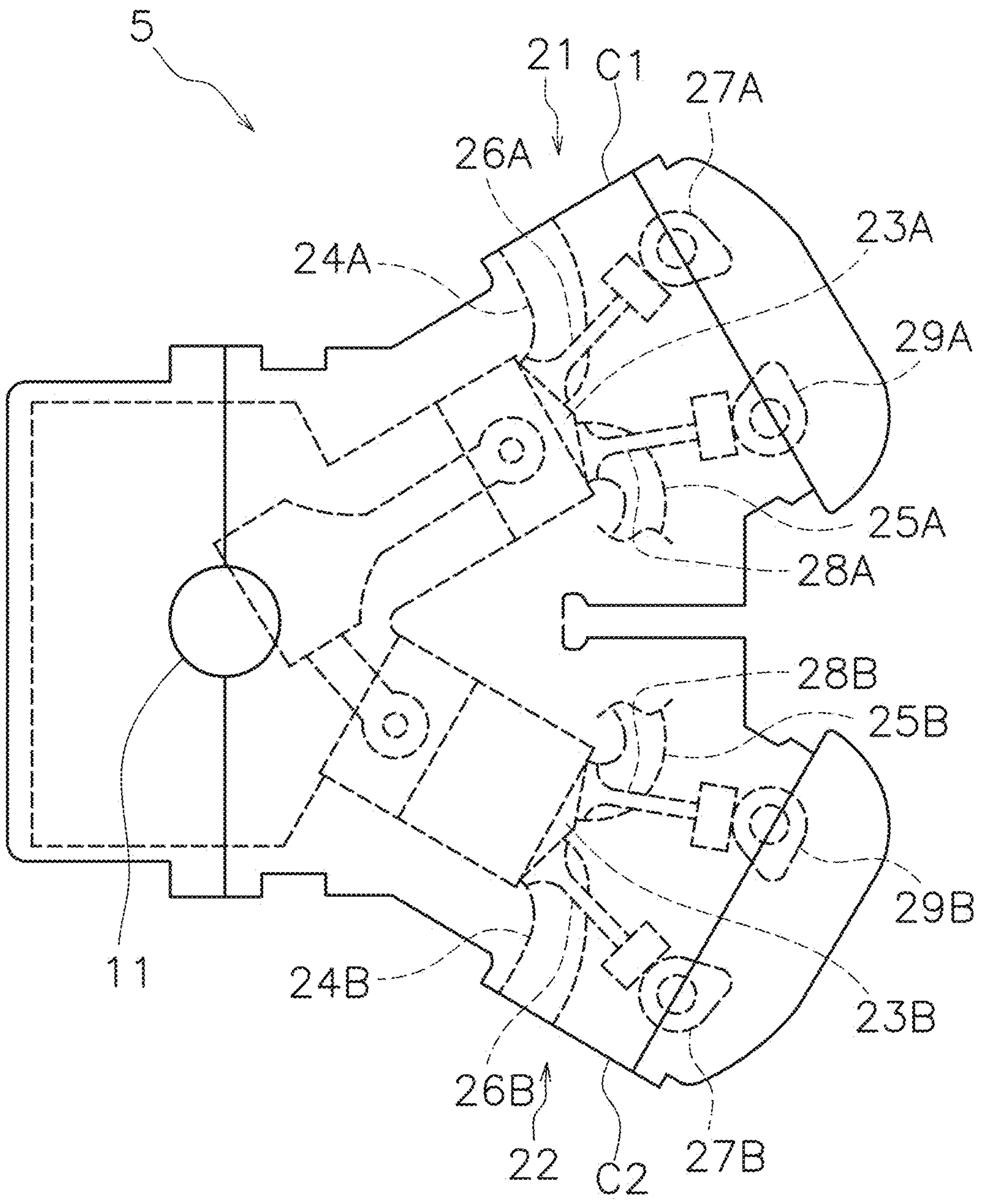
FIG. 2 is a top view of an engine of the marine propulsion device.
Figure 3:
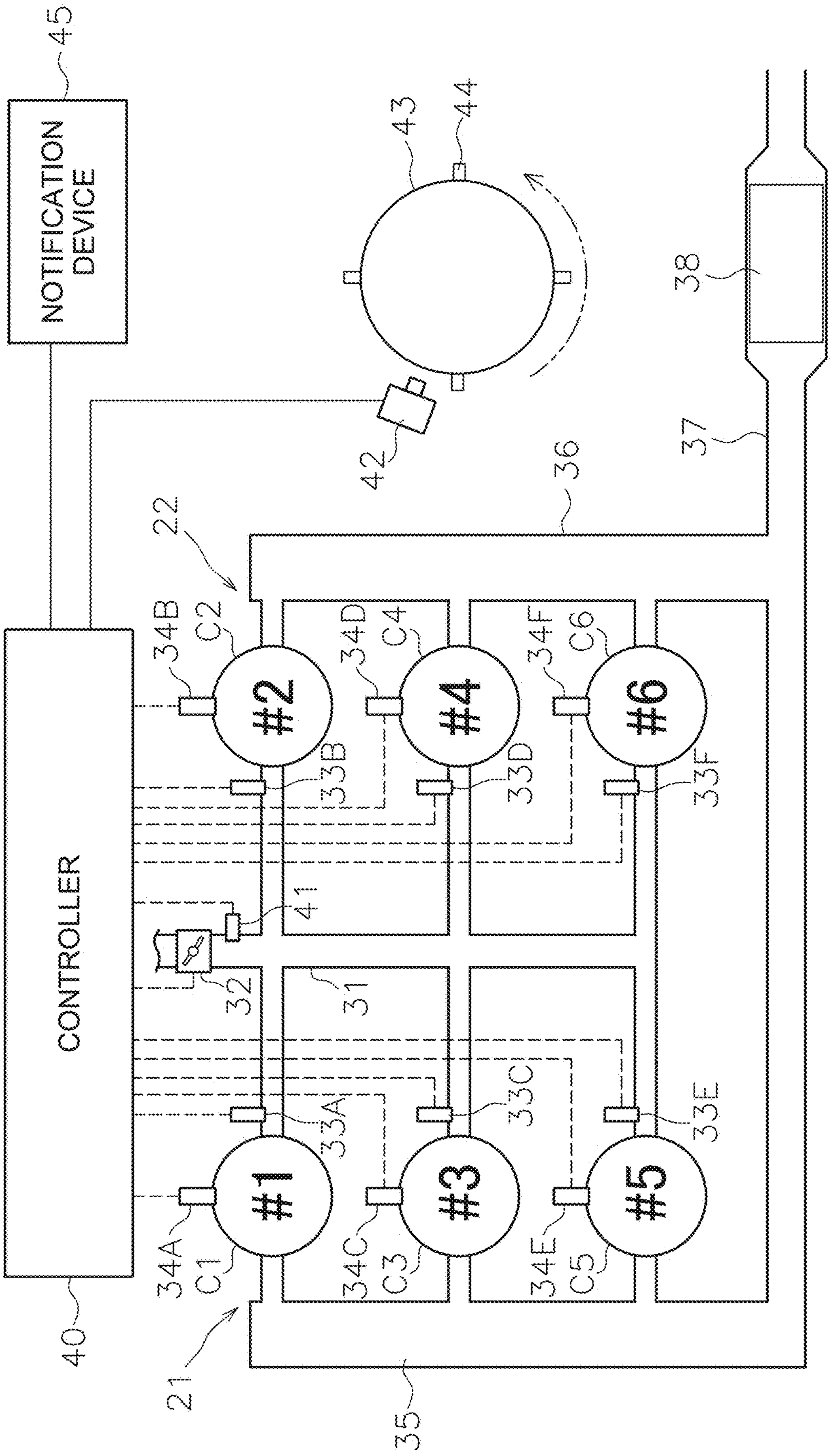
FIG. 3 is a schematic diagram of a control system of the marine propulsion device.

FIG. 2 is a top view of the engine 5. FIG. 3 is a schematic diagram showing a configuration of the engine 5 and a control system of the marine propulsion device 1. As shown in FIGS. 2 and 3, the engine 5 includes a first bank 21 and a second bank 22. As shown in FIG. 3, the first bank 21 includes a first cylinder C1, a third cylinder C3, and a fifth cylinder C5. The second bank 22 includes a second cylinder C2, a fourth cylinder C4, and a sixth cylinder C6. The second bank 22 is in alignment with the first bank 21 to define a V-shape together therewith. In other words, the engine 5 is of a V6 cylinder engine.

As shown in FIG. 2, the first cylinder C1 includes a combustion chamber 23A, an intake port 24A, and an exhaust port 25A. The intake port 24A and the exhaust port 25A are connected to the combustion chamber 23A. The first cylinder C1 includes an intake valve 26A and an intake cam 27A. The intake valve 26A opens and closes the intake port 24A. The intake cam 27A is rotated by the drive force transmitted thereto from the engine 5 to actuate the intake valve 26A. The first cylinder C1 includes an exhaust valve 28A and an exhaust cam 29A. The exhaust valve 28A opens and closes the exhaust port 25A. The exhaust cam 29A is rotated by the drive force transmitted thereto from the engine 5 to actuate the exhaust valve 28A.

The second cylinder C2 is substantially bilaterally symmetrical in structure to the first cylinder C1. The second cylinder C2 includes a combustion chamber 23B, an intake port 24B, an exhaust port 25B, an intake valve 26B, an intake cam 27B, an exhaust valve 28B, and an exhaust cam 29B. The combustion chamber 23B, the intake port 24B, the exhaust port 25B, the intake valve 26B, the intake cam 27B, the exhaust valve 28B, and the exhaust cam 29B in the second cylinder C2 are comparable in structure to the combustion chamber 23A, the intake port 24A, the exhaust port 25A, the intake valve 26A, the intake cam 27A, the exhaust valve 28A, and the exhaust cam 29A in the first cylinder C1, respectively.

The third and fifth cylinders C3 and C5 are each comparable in structure to the first cylinder C1. The first, third, and fifth cylinders C1, C3, and C5 are aligned in the up-and-down direction. The fourth and sixth cylinders C4 and C6 are each comparable in structure to the second cylinder C2. The second, fourth, and sixth cylinders C2, C4, and C6 are aligned in the up-and-down direction.

As shown in FIG. 3, the marine propulsion device 1 includes an intake pipe 31 and a throttle valve 32. The intake pipe 31 is connected to the intake ports of the cylinders C1 to C6. An air-fuel mixture is fed to the intake port of each of the cylinders C1 to C6 through the intake pipe 31. The throttle valve 32 is attached to the intake pipe 31. The throttle valve 32 is changed in opening degree to regulate the amount of intake mixture to be fed to the combustion chamber of each of the cylinders C1 to C6.

The marine propulsion device 1 includes fuel injection devices 33A to 33F and ignition devices 34A to 34F. The fuel injection devices 33A to 33F are attached to the cylinders C1 to C6, respectively; likewise, the ignition devices 34A to 34F are attached to the cylinders C1 to C6, respectively. The fuel injection devices 33A to 33F inject a fuel to the intake ports of the cylinders C1 to C6, respectively. The ignition devices 34A to 34F ignite the fuel inside the combustion chambers of the cylinders C1 to C6, respectively.

The marine propulsion device 1 includes a first exhaust manifold 35, a second exhaust manifold 36, and an exhaust pipe 37. The first exhaust manifold 35 is connected to the exhaust ports of the cylinders C1, C3, and C5 in the first bank 21. The second exhaust manifold 36 is connected to the exhaust ports of the cylinders C2, C4, and C6 in the second bank 22.

The exhaust pipe 37 is connected to the first and second exhaust manifolds 35 and 36. A catalyst 38 is disposed inside the exhaust pipe 37. The catalyst 38 is, for instance, a three-way catalyst that purifies an exhaust gas flowing through the exhaust pipe 37. The exhaust gas from the cylinders C1, C3, and C5 in the first bank is discharged to the outside of the marine propulsion device 1 through the first exhaust manifold 35 and the exhaust pipe 37. The exhaust gas from the cylinders C2, C4, and C6 in the second bank is discharged to the outside of the marine propulsion device 1 through the second exhaust manifold 36 and the exhaust pipe 37.

The marine propulsion device 1 includes a controller 40. The controller 40 is an electronic control unit that includes a processor such as a CPU and memories such as a RAM and a ROM. The controller 40 stores programs to control the engine 5. The controller 40 executes processes to control the engine 5 based on the programs. The controller 40 is configured or programmed to control the throttle valve 32, the fuel injection devices 33A to 33F, and the ignition devices 34A to 34F based on data regarding the engine 5 detected by sensors (to be described).

The marine propulsion device 1 includes an intake pressure sensor 41 and an engine rotation sensor 42. The intake pressure sensor 41 is attached to the intake pipe 31. The intake pressure sensor 41 detects an intake pressure inside the intake pipe 31. The controller 40 is configured or programmed to determine an engine rotational speed, an angular velocity of the crankshaft 11, an angular acceleration of the crankshaft 11, and an angular acceleration deviation of the crankshaft 11 by the engine rotation sensor 42. The engine 5 includes a flywheel 43 connected to the crankshaft 11. The flywheel 43 includes a plurality of protrusions 44 spaced apart from each other at intervals in a circumferential direction of the flywheel 43. It should be noted that in the figures, reference numeral 44 is assigned to only one of the plurality of protrusions without being assigned to the other protrusions.

The engine rotation sensor 42 may be a magnetic sensor to detect passage of the protrusions 44 on the flywheel 43. The controller 40 calculates the angular velocity of the crankshaft 11 based on time intervals of detecting the protrusions 44 and central angles between the protrusions 44. The controller 40 calculates the engine rotational speed based on the angular velocity of the crankshaft 11. The controller 40 calculates the angular acceleration of the crankshaft 11 based on the angular velocity of the crankshaft 11.

The controller 40 executes a misfire monitoring control to monitor whether or not a misfire has occurred in the engine 5 based on the data detected by the sensors described above. The term “misfire” means that fuel combustion does not occur in at least one of the combustion chambers of the plurality of cylinders C1 to C6 due to some reason. The misfire monitoring control will be hereinafter explained.

Figure 4:
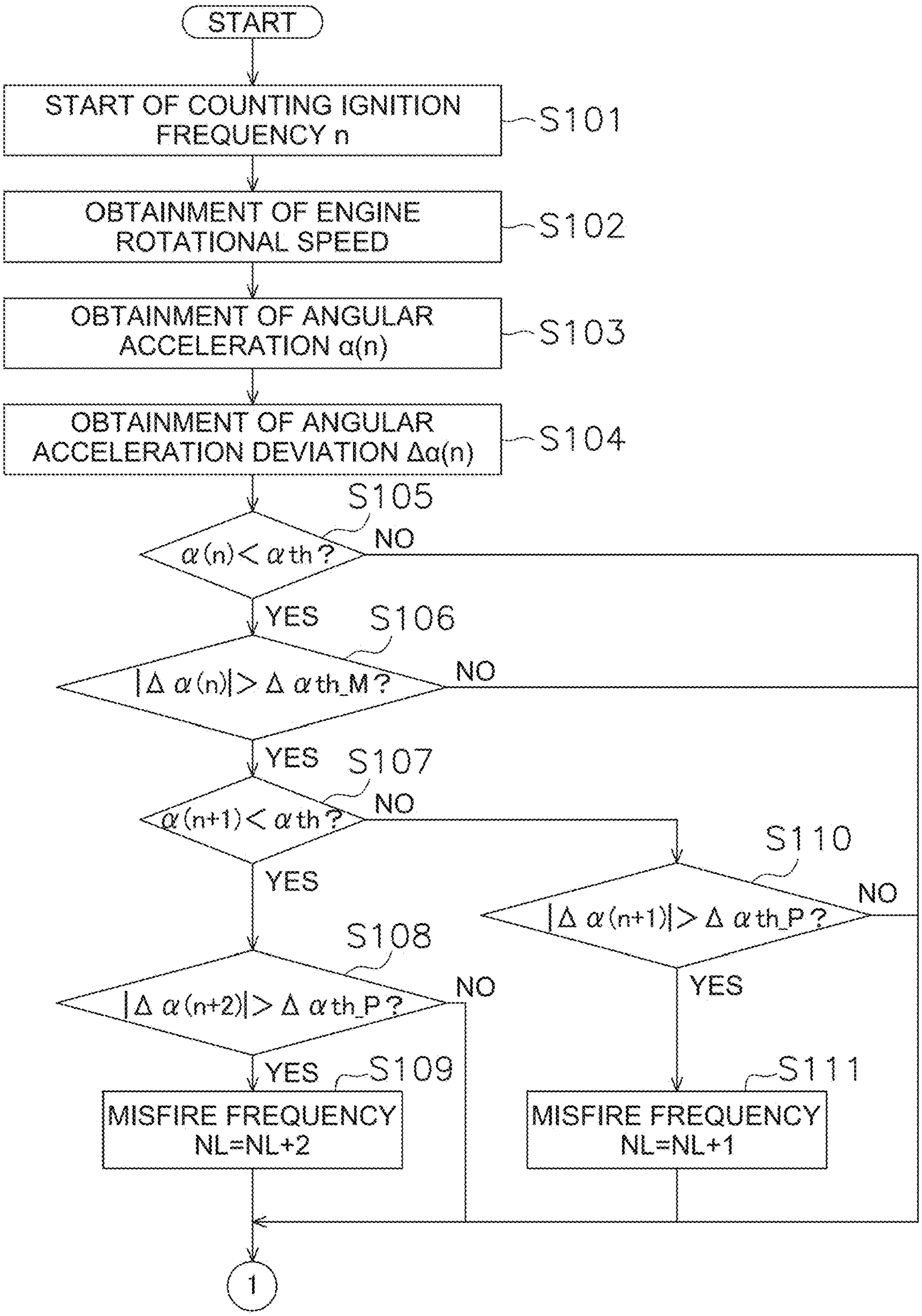
FIG. 4 is a flowchart showing a series of processes of a misfire monitoring control.
Figure 5:
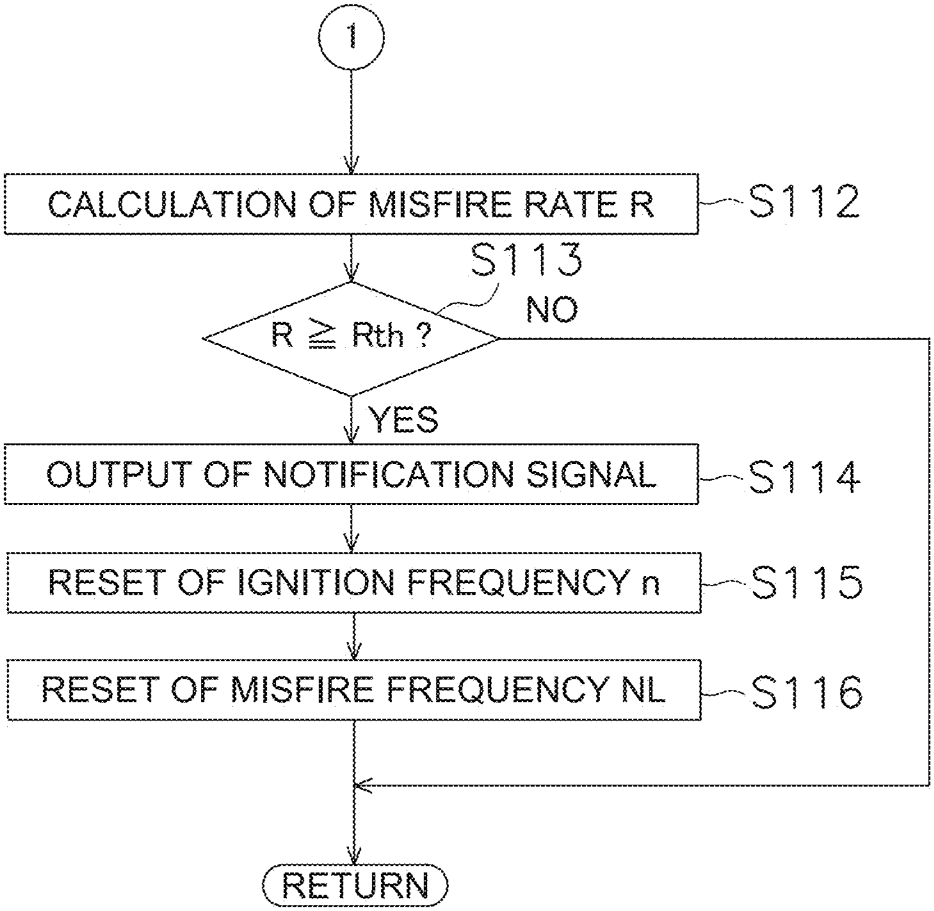
FIG. 5 is a flowchart showing a series of processes of a misfire monitoring control.

FIGS. 4 and 5 are flowcharts showing a series of processes of the misfire monitoring control executed by the controller 40.

As shown in FIG. 4, the controller 40 starts counting ignition frequency n in step S101. The ignition frequency n is the total number of times that ignition has been made in the plurality of cylinders C1 to C6. In step S102, the controller 40 obtains the engine rotational speed. The controller 40 obtains the engine rotational speed based on the data transmitted thereto from the engine rotation sensor 42. The controller 40 obtains the engine rotational speed at an ignition timing in each of the plurality of cylinders C1 to C6.

In step S103, the controller 40 obtains an angular acceleration $\alpha(n)$. The angular acceleration $\alpha(n)$ is a determination parameter to determine whether or not a misfire has occurred in the engine 5. The controller 40 obtains the angular acceleration $\alpha(n)$ based on the data transmitted thereto from the engine rotation sensor 42. The controller 40 obtains the angular acceleration $\alpha(n)$ at the ignition timing in each of the plurality of cylinders C1 to C6.

In step S104, the controller 40 obtains an angular acceleration deviation $\Delta\alpha(n)$. The angular acceleration deviation $\Delta\alpha(n)$ is a determination parameter to determine whether or not a misfire has occurred in the engine 5. The controller 40 obtains the angular acceleration deviation $\Delta\alpha(n)$ based on change in the angular acceleration $\alpha(n)$. The controller 40 obtains the angular acceleration deviation $\Delta\alpha(n)$ at the ignition timing in each of the plurality of cylinders C1 to C6.

Figure 6:
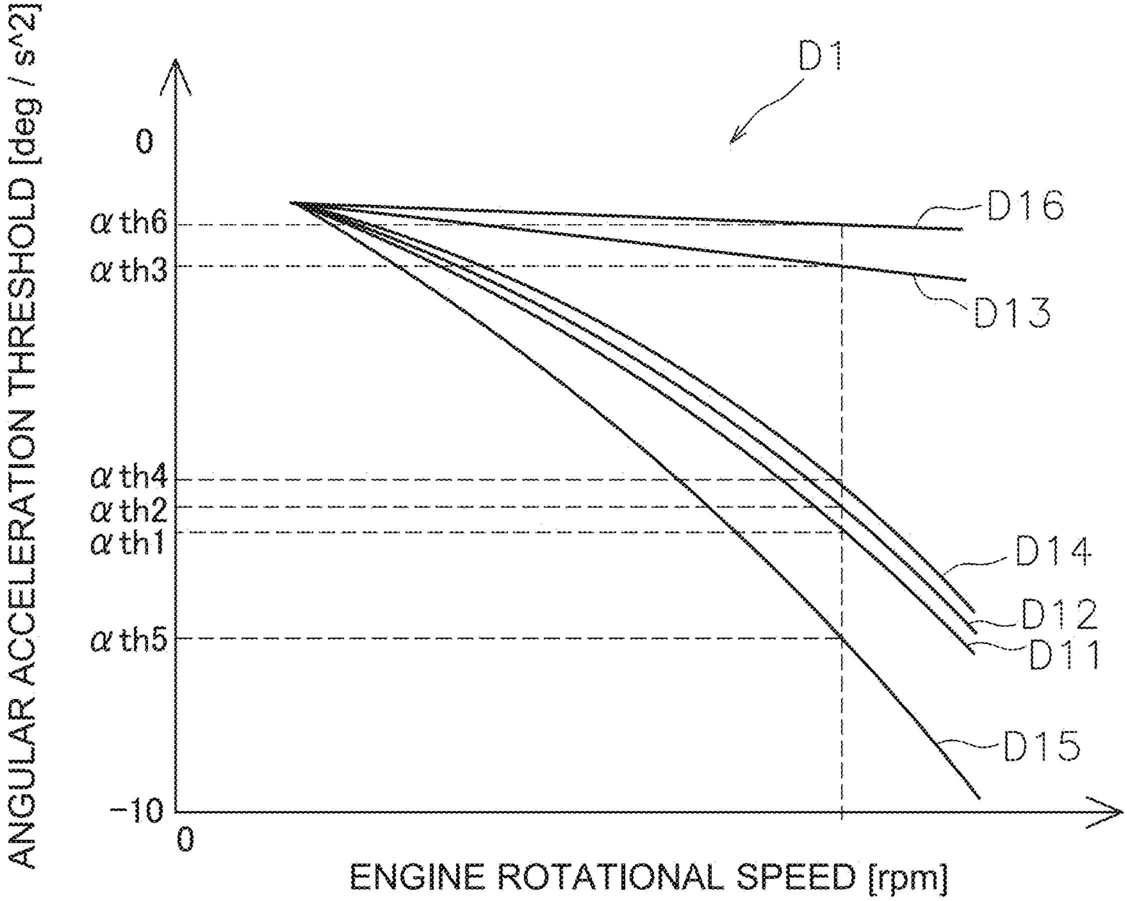
FIG. 6 is a chart exemplifying threshold data of angular acceleration.

In step S105, the controller 40 determines whether or not the angular acceleration $\alpha(n)$ is less than a predetermined angular acceleration threshold $\alpha th$. The angular acceleration threshold $\alpha th$ is uniquely set for each of the plurality of cylinders C1 to C6. FIG. 6 is a chart exemplifying threshold data D1 regarding the angular acceleration threshold $\alpha th$ in each of the cylinders C1 to C6. The angular acceleration threshold $\alpha th$ changes with the engine rotational speed. The threshold data D1 regarding the angular acceleration threshold $\alpha th$ define a relationship between the engine rotational speed and the angular acceleration threshold $\alpha th$. It should be noted that the angular acceleration threshold $\alpha th$ changes with the intake pressure as well. The controller 40 stores the threshold data depending on the intake pressure. The threshold data D1 shown in FIG. 6 indicate a relationship between the engine rotational speed and the angular acceleration threshold $\alpha th$ at a predetermined intake pressure.

The threshold data D1 include first threshold data D11, second threshold data D12, third threshold data D13, fourth threshold data D14, fifth threshold data D15, and sixth threshold data D16. The first threshold data D11 define a relationship between the engine rotational speed and the angular acceleration threshold $\alpha th$ in the first cylinder C1 (hereinafter referred to as a first threshold $\alpha th1$). The second threshold data D12 define a relationship between the engine rotational speed and the angular acceleration threshold $\alpha th$ in the second cylinder C2 (hereinafter referred to as a second threshold $\alpha th2$). The third threshold data D13 define a relationship between the engine rotational speed and the angular acceleration threshold $\alpha th$ in the third cylinder C3 (hereinafter referred to as a third threshold $\alpha th3$). The fourth threshold data D14 define a relationship between the engine rotational speed and the angular acceleration threshold $\alpha th$ in the fourth cylinder C4 (hereinafter referred to as a fourth threshold $\alpha th4$). The fifth threshold data D15 define a relationship between the engine rotational speed and the angular acceleration threshold $\alpha th$ in the fifth cylinder C5 (hereinafter referred to as a fifth threshold $\alpha th5$). The sixth threshold data D16 define a relationship between the engine rotational speed and the angular acceleration threshold $\alpha th$ in the sixth cylinder C6 (hereinafter referred to as a sixth threshold $\alpha th6$).

The first, second, third, fourth, fifth, and sixth threshold data D11, D12, D13, D14, D15, and D16 exert characteristics different from each other. Therefore, the first to sixth thresholds $\alpha th1$ to $\alpha th6$ are different from each other at an identical engine rotational speed. However, the first to sixth thresholds $\alpha th1$ to $\alpha th6$ may be identical in part with each other at the identical engine rotational speed.

The controller 40 determines the first threshold $\alpha th1$ based on the engine rotational speed with reference to the first threshold data D11. The controller 40 determines the second threshold $\alpha th2$ based on the engine rotational speed with reference to the second threshold data D12. The controller 40 determines the third threshold $\alpha th3$ based on the engine rotational speed with reference to the third threshold data D13. The controller 40 determines the fourth threshold $\alpha th4$ based on the engine rotational speed with reference to the fourth threshold data D14. The controller 40 determines the fifth threshold $\alpha th5$ based on the engine rotational speed with reference to the fifth threshold data D15. The controller 40 determines the sixth threshold $\alpha th6$ based on the engine rotational speed with reference to the sixth threshold data D16.

In step S105, the controller 40 determines whether or not the angular acceleration $\alpha(n)$ at the ignition timing in the first cylinder C1 is less than the first threshold $\alpha th1$. The controller 40 determines whether or not the angular acceleration $\alpha(n)$ at the ignition timing in the second cylinder C2 is less than the second threshold $\alpha th2$. The controller 40 determines whether or not the angular acceleration $\alpha(n)$ at the ignition timing in the third cylinder C3 is less than the third threshold $\alpha th3$. The controller 40 determines whether or not the angular acceleration $\alpha(n)$ at the ignition timing in the fourth cylinder C4 is less than the fourth threshold $\alpha th4$. The controller 40 determines whether or not the angular acceleration $\alpha(n)$ at the ignition timing in the fifth cylinder C5 is less than the fifth threshold $\alpha th5$. The controller 40 determines whether or not the angular acceleration $\alpha(n)$ at the ignition timing in the sixth cylinder C6 is less than the sixth threshold $\alpha th6$. In step S105, if the angular acceleration $\alpha(n)$ at the ignition timing in one of the plurality of cylinders C1 to C6 is less than the angular acceleration threshold set for the aforementioned one of the plurality of cylinders C1 to C6 among the angular acceleration thresholds $\alpha th1$ to $\alpha th6$, the process proceeds to step S106.

Figure 7:
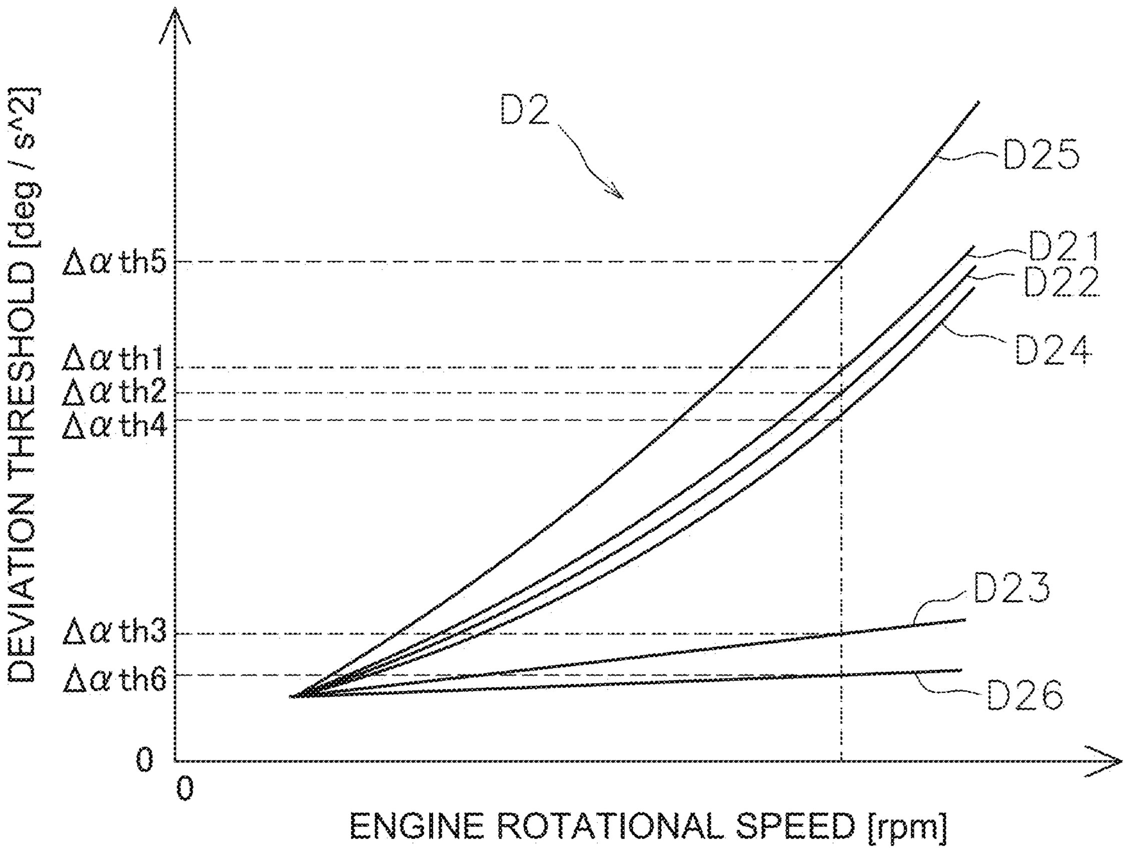
FIG. 7 is a chart exemplifying threshold data of angular acceleration deviation.

In step S106, the controller 40 determines whether or not the absolute value of the angular acceleration deviation $\Delta\alpha(n)$ is greater than a predetermined deviation threshold $\Delta\alpha th\_M$. The deviation threshold $\Delta\alpha th\_M$ is uniquely set for each of the plurality of cylinders C1 to C6. FIG. 7 is a chart exemplifying threshold data D2 regarding the deviation threshold $\Delta\alpha th\_M$ in each of the cylinders C1 to C6. The deviation threshold $\Delta\alpha th\_M$ changes with the engine rotational speed. The threshold data D2 regarding the deviation threshold $\Delta\alpha th\_M$ define a relationship between the engine rotational speed and the deviation threshold $\Delta\alpha th\_M$. It should be noted that the deviation threshold $\Delta\alpha th\_M$ changes with the intake pressure as well. The controller 40 stores the threshold data depending on the intake pressure. The threshold data D2 shown in FIG. 7 indicate a relationship between the engine rotational speed the deviation threshold $\Delta\alpha th\_M$ at a predetermined intake pressure.

The threshold data D2 include first threshold data D21, second threshold data D22, third threshold data D23, fourth threshold data D24, fifth threshold data D25, and sixth threshold data D26. The first threshold data D21 define a relationship between the engine rotational speed and the deviation threshold Δαth_M in the first cylinder C1 (hereinafter referred to as a first deviation threshold Δαth1). The second threshold data D22 define a relationship between the engine rotational speed and the deviation threshold Δαth_M in the second cylinder C2 (hereinafter referred to as a second deviation threshold Δαth2). The third threshold data D23 define a relationship between the engine rotational speed and the deviation threshold Δαth_M in the third cylinder C3 (hereinafter referred to as a third deviation threshold Δαth3). The fourth threshold data D24 define a relationship between the engine rotational speed and the deviation threshold Δαth_M in the fourth cylinder C4 (hereinafter referred to as a fourth deviation threshold Δαth4). The fifth threshold data D25 define a relationship between the engine rotational speed and the deviation threshold Δαth_M in the fifth cylinder C5 (hereinafter referred to as a fifth deviation threshold Δαth5). The sixth threshold data D26 define a relationship between the engine rotational speed and the deviation threshold Δαth_M in the sixth cylinder C6 (hereinafter referred to as a sixth deviation threshold Δαth6).

The first, second, third, fourth, fifth, and sixth threshold data D21, D22, D23, D24, D25, and D26 exert characteristics different from each other. Therefore, the first to sixth deviation thresholds Δαth1 to Δαth6 are different from each other at an identical engine rotational speed. However, the first to sixth deviation thresholds Δαth1 to Δαth6 may be identical in part with each other at the identical engine rotational speed.

The controller 40 determines the first deviation threshold Δαth1 based on the engine rotational speed with reference to the first threshold data D21. The controller 40 determines the second deviation threshold Δαth2 based on the engine rotational speed with reference to the second threshold data D22. The controller 40 determines the third deviation threshold Δαth3 based on the engine rotational speed with reference to the third threshold data D23. The controller 40 determines the fourth deviation threshold Δαth4 based on the engine rotational speed with reference to the fourth threshold data D24. The controller 40 determines the fifth deviation threshold Δαth5 based on the engine rotational speed with reference to the fifth threshold data D25. The controller 40 determines the sixth deviation threshold Δαth6 based on the engine rotational speed with reference to the sixth threshold data D26.

In step S106, the controller 40 determines whether or not the absolute value of the angular acceleration deviation Δα(n) at the ignition timing in the first cylinder C1 is greater than the first deviation threshold Δαth1. The controller 40 determines whether or not the absolute value of the angular acceleration deviation Δα(n) at the ignition timing in the second cylinder C2 is greater than the second deviation threshold Δαth2. The controller 40 determines whether or not the absolute value of the angular acceleration deviation Δα(n) at the ignition timing in the third cylinder C3 is greater than the third deviation threshold Δαth3. The controller 40 determines whether or not the absolute value of the angular acceleration deviation Δα(n) at the ignition timing in the fourth cylinder C4 is greater than the fourth deviation threshold Δαth4. The controller 40 determines whether or not the absolute value of the angular acceleration deviation Δα(n) at the ignition timing in the fifth cylinder C5 is greater than the fifth deviation threshold Δαth5. The controller 40 determines whether or not the absolute value of the angular acceleration deviation Δα(n) at the ignition timing in the sixth cylinder C6 is greater than the sixth deviation threshold Δαth6. If the absolute value of the angular acceleration deviation Δα(n) at the ignition timing in one of the plurality of cylinders C1 to C6 is greater than the deviation threshold set for the aforementioned one of the cylinders C1 to C6 among the deviation thresholds Δαth1 to Δαth6, the process proceeds to step S107.

In step S107, the controller 40 determines whether or not an angular acceleration (n+1) is less than the angular acceleration threshold αth. In a manner comparable to step S105, the controller 40 determines whether or not the angular acceleration (n+1) is less than the angular acceleration threshold αth. When the angular acceleration α(n+1) is less than the angular acceleration threshold αth, the process proceeds to step S108.

In step S108, the controller 40 determines whether or not the absolute value of an angular acceleration deviation Δα(n+2) is greater than a predetermined deviation threshold Δαth_P. The deviation threshold Δαth_P is set as a basis to determine whether or not the angular acceleration deviation has changed to an acceleration side when restored. In a manner comparable to the deviation threshold Δαth_M, the deviation threshold Δαth_P is uniquely set for each of the plurality of cylinders C1 to C6.

In a manner comparable to step S106, the controller 40 determines whether or not the absolute value of the angular acceleration deviation Δα(n+2) corresponding to each of the cylinders C1 to C6 is greater than the deviation threshold Δαth_P uniquely set for each of the cylinders C1 to C6. If the absolute value of the angular acceleration deviation Δα(n+2) at the ignition timing in one of the plurality of cylinders C1 to C6 is greater than the deviation thresholds Δαth_P set for the aforementioned one of the cylinders C1 to C6, the process proceeds to step S109. In step S109, the controller 40 adds "2" to misfire frequency NL. In other words, the controller 40 counts misfires sequentially occurred in two cylinders.

In step S107, if the angular acceleration α(n+1) is greater than or equal to the angular acceleration threshold αth, the process proceeds to step S110. In step S110, the controller 40 determines whether or not the absolute value of an angular acceleration deviation Δα(n+1) is greater than the predetermined deviation threshold Δαth_P. If the absolute value of the angular acceleration deviation Δα(n+1) is greater than the predetermined deviation threshold Δαth_P, the process proceeds to step S111. In step S111, the controller 40 adds "1" to the misfire frequency NL. In other words, the controller 40 counts a misfire occurred in a single cylinder.

As shown in FIG. 5, in step S112, the controller 40 calculates a misfire rate R. The controller 40 calculates the misfire rate R based on the following formula (1).

$$R=NL/n \tag{1}$$

In other words, the misfire rate R is a ratio of the misfire frequency NL to the ignition frequency n. In step S113, the controller 40 determines whether or not the misfire rate R is greater than or equal to a predetermined misfire rate threshold Rth. If the misfire rate R is greater than or equal to the predetermined misfire rate threshold Rth, the process proceeds to step S114.

In step S114, the controller 40 outputs notification signals. As shown in FIG. 3, the control system of the marine propulsion device 1 includes a notifier 45. The notifier 45 notifies a user that a misfire has occurred in the engine 5. The notifier 45 includes, for instance, a display. The notifier 45 is disposed in a watercraft in which the marine propulsion device 1 is provided. Alternatively, the notifier 45 may be provided in the marine propulsion device 1.

The controller 40 determines that a misfire has occurred in the engine 5 when the misfire rate R is greater than or equal to the predetermined misfire rate threshold Rth. When it is determined that a misfire has occurred in the engine 5, the controller 40 controls the notifier 45 to notify the user of an occurrence of misfire. For example, the controller 40 outputs the notification signals to the notifier 45 so as to cause the notifier 45 to display the occurrence of misfire by a message or an icon.

In step S115, the ignition frequency n is reset to "0". In step S116, the misfire frequency NL is reset to "0". Then, the process returns to step S101 such that the controller 40 repeatedly executes the series of processes in steps S101 to S116.

In the marine propulsion device 1 according to an example embodiment explained above, it is determined whether or not a misfire has occurred in the engine 5 by comparing the angular acceleration $\alpha(n)$ of the crankshaft 11 and the angular acceleration thresholds $\alpha$th1 to $\alpha$th6 set for the plurality of cylinders C1 to C6 on a one-to-one basis. It is determined whether or not a misfire has occurred in the engine 5 by comparing the angular acceleration deviation $\Delta\alpha(n)$ of the crankshaft 11 and the deviation thresholds $\Delta\alpha$th1 to $\Delta\alpha$th6 set for the plurality of cylinders C1 to C6 on a one-to-one basis. Because of this, even when the combustion state varies among the plurality of cylinders C1 to C6, it is possible to accurately determine whether or not a misfire has occurred by using thresholds appropriately set for the cylinders C1 to C6 on a one-to-one basis.

Example embodiments of the present invention have been explained above. However, the present invention is not limited to the example embodiments described above, and a variety of changes can be made without departing from the gist of the present invention.

The marine propulsion device 1 is not limited to the outboard motor, and alternatively, may be another type of propulsion device such as an inboard engine outboard drive or a jet propulsion device. The configuration of the engine 5 is not limited to that in the example embodiments described above and may be changed. For example, the number of cylinders in the engine 5 is not limited to six, and alternatively, may be less than six or greater than six. The cylinder alignment in the engine 5 is not limited to be of the V type, and alternatively, may be of another type such as an inline type or a horizontally opposed type.

The engine rotation sensor 42 is not limited to the magnetic type, and alternatively, may be of another type such as an optical type. The notifier 45 is not limited to the display, and alternatively, may be another type of device such as a buzzer, speaker, or warning lamp.

The process of the misfire monitoring control is not limited to that in the example embodiments described above and may be changed. For example, the controller 40 may provide notification of an occurrence of misfire if the misfire frequency NL is greater than or equal to a predetermined misfire frequency threshold. Whether or not a misfire has occurred may be determined with respect to each of the plurality of cylinders C1 to C6. For example, the controller 40 may provide notification an occurrence of misfire when the misfire rate or the misfire frequency is greater than or equal to a corresponding threshold in each of the plurality of cylinders C1 to C6. The determination parameter to determine whether or not a misfire has occurred is not limited to the angular acceleration of the crankshaft 11 and the angular acceleration deviation of the crankshaft 11. For example, the determination parameter may be an angular jerk.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method of controlling a marine propulsion device including an engine including a plurality of cylinders and a crankshaft, the method comprising:
- obtaining an angular acceleration of the crankshaft;
- obtaining a determination parameter to determine whether or not a misfire has occurred in the engine based on the angular acceleration of the crankshaft; and
- determining whether or not the misfire has occurred in the engine by comparing the determination parameter and a plurality of thresholds for each of the plurality of cylinders; wherein
- the plurality of cylinders include a first cylinder and a second cylinder;
- the plurality of thresholds include a first threshold for the first cylinder and a second threshold for the second cylinder different from the first threshold; and
- the method further comprises:
  - obtaining a first value of the determination parameter at an ignition timing in the first cylinder;
  - obtaining a second value of the determination parameter at an ignition timing in the second cylinder;
  - determining whether or not the misfire has occurred in the engine by comparing the first value and the first threshold; and
  - determining whether or not the misfire has occurred in the engine by comparing the second value and the second threshold.

2. The method according to claim 1, further comprising:
- obtaining a rotational speed of the engine;
- determining the first threshold based on the rotational speed of the engine with reference to first threshold data defining a relationship between the first threshold and the rotational speed of the engine; and
- determining the second threshold based on the rotational speed of the engine with reference to second threshold data defining a relationship between the second threshold and the rotational speed of the engine.

3. The method according to claim 1, further comprising:
- notifying that the misfire has occurred when it is determined that the misfire has occurred in the engine.

4. The method according to claim 1, wherein the determination parameter includes at least one of the angular acceleration of the crankshaft, a deviation of the angular acceleration, or an angular jerk.

5. A system for controlling a marine propulsion device including an engine including a plurality of cylinders and a crankshaft, the system comprising:
- a sensor to detect an angular acceleration of the crankshaft; and
- a controller configured or programmed to:
  - obtain the angular acceleration of the crankshaft;
  - obtain a determination parameter to determine whether or not a misfire has occurred in the engine based on the angular acceleration of the crankshaft; and
  - determine whether or not the misfire has occurred in the engine by comparing the determination parameter and a plurality of thresholds for each of the plurality of cylinders; wherein
- the plurality of cylinders include a first cylinder and a second cylinder;

the plurality of thresholds include a first threshold for the first cylinder and a second threshold for the second cylinder different from the first threshold; and the controller is further configured or programmed to:

obtain a first value of the determination parameter at an ignition timing in the first cylinder;

obtain a second value of the determination parameter at an ignition timing in the second cylinder;

determine whether or not the misfire has occurred in the engine by comparing the first value and the first threshold; and determine whether or not the misfire has occurred in the engine by comparing the second value and the second threshold.

6. The system according to claim 5, wherein the controller is configured or programmed to:

obtain a rotational speed of the engine;

determine the first threshold based on the rotational speed of the engine with reference to first threshold data defining a relationship between the first threshold and the rotational speed of the engine; and determine the second threshold based on the rotational speed of the engine with reference to second threshold data defining a relationship between the second threshold and the rotational speed of the engine.

7. The system according to claim 5, further comprising:

a notifier to provide notification of a misfire in the engine; wherein the controller is configured or programmed to control the notifier to provide the notification of the misfire when it is determined that the misfire has occurred in the engine.

8. The system according to claim 5, wherein the determination parameter includes at least one of the angular acceleration of the crankshaft, a deviation of the angular acceleration, or an angular jerk.

* * * * *